United States Patent
Gritzman et al.

(10) Patent No.: US 10,993,417 B2
(45) Date of Patent: May 4, 2021

(54) DETECTION AND MANAGEMENT OF DISEASE OUTBREAKS IN LIVESTOCK USING HEALTH GRAPH NETWORKS

(71) Applicant: International Business Machines Corporation, Armonk, NY (US)

(72) Inventors: Ashley D. Gritzman, Johannesburg (ZA); Toby Kurien, Midrand (ZA); Komminist Weldemariam, Ottawa (CA); Darlington Shingirirai Mapiye, Randburg (ZA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/540,211

(22) Filed: Aug. 14, 2019

(65) Prior Publication Data

US 2021/0045362 A1    Feb. 18, 2021

(51) Int. Cl.
*A01K 29/00*    (2006.01)
*A01K 11/00*    (2006.01)
(Continued)

(52) U.S. Cl.
CPC .......... *A01K 29/005* (2013.01); *A01K 11/004* (2013.01); *A01K 11/006* (2013.01);
(Continued)

(58) Field of Classification Search
None
See application file for complete search history.

(56) References Cited

U.S. PATENT DOCUMENTS

| | | | |
|---|---|---|---|
| 7,810,451 B2 | 10/2010 | Pratt | |
| 7,830,815 B1 * | 11/2010 | Koren | G06Q 30/02 |
| | | | 370/252 |

(Continued)

FOREIGN PATENT DOCUMENTS

| | | |
|---|---|---|
| CA | 2493331 A1 | 7/2006 |
| CN | 105615854 A | 6/2016 |
| WO | 2017162673 A1 | 9/2017 |

OTHER PUBLICATIONS

Noremark, M., et al., "EpiContactTrace: an R-package for contact tracing during livestock disease outbreaks and for risk-based surveillance", BMC Vet Res., Published online Mar. 17, 2014, 15 pages, 10: 71 https://www.ncbi.nlm.nih.gov/pmc/articles/PMC3974595/.

(Continued)

*Primary Examiner* — Curtis A Kuntz
*Assistant Examiner* — Shawna M Kingston
(74) *Attorney, Agent, or Firm* — Scully, Scott. Murphy & Presser, P.C.; Shimon Benjamin

(57) ABSTRACT

Sensor data captured over time and associated with a plurality of livestock animals can be analyzed to determine health conditions associated with a plurality of livestock animals and to determine interactions of the livestock animals. The interactions specify at least distances between the livestock animals, duration of the distances, and frequency of the interactions. A health graph network is constructed, which includes nodes and edges, a node in the nodes representing a livestock animal and specifying at least a health condition of the represented livestock animal, an edge connecting at least two of the nodes and representing an interaction between at least two animals represented by said at least two of the nodes. Based on the health graph network, (Continued)

a potential outbreak among a subgroup of the livestock animals can be predicted.

20 Claims, 11 Drawing Sheets

(51) Int. Cl.
*H04W 4/029* (2018.01)
*G06T 7/70* (2017.01)
*G06K 9/00* (2006.01)

(52) U.S. Cl.
CPC ..... *G06K 9/00362* (2013.01); *G06K 9/00671* (2013.01); *G06T 7/70* (2017.01); *H04W 4/029* (2018.02)

(56) References Cited

U.S. PATENT DOCUMENTS

| | | | | |
|---|---|---|---|---|
| 2008/0312511 | A1* | 12/2008 | Osler | A61B 5/02055 600/300 |
| 2009/0082997 | A1* | 3/2009 | Tokman | G16H 50/80 702/179 |
| 2009/0265106 | A1* | 10/2009 | Bearman | G06Q 50/10 701/300 |
| 2013/0222141 | A1 | 8/2013 | Rhee et al. | |
| 2014/0302783 | A1 | 10/2014 | Aiuto et al. | |
| 2015/0245167 | A1* | 8/2015 | Bobrow | H04W 8/005 455/41.2 |
| 2016/0026255 | A1* | 1/2016 | Katz | H04N 5/23222 345/156 |
| 2017/0024531 | A1* | 1/2017 | Malaviya | G16H 50/30 |
| 2017/0280687 | A1 | 10/2017 | Vrabete et al. | |
| 2018/0218057 | A1 | 8/2018 | Beckham et al. | |
| 2019/0045274 | A1* | 2/2019 | Parks | G06Q 30/0264 |

OTHER PUBLICATIONS

Volkova, V. V., et al., "Evaluation of risks of foot-and-mouth disease in Scotland to assist with decision making during the 2007 outbreak in the UK", Vet Rec., Published online Jul. 15, 2011, 10 pages, 169(5): 124 https://www.ncbi.nlm.nih.gov/pmc/articles/PMC3361954/.

Roberti, M., "Which Active RFID System is Best for Tracking Livestock in Real Time?", RFID Journal, Jun. 26, 2013, 1 page https://www.rfidjournal.com/blogs/experts/entry?10601.

Wankhede, K., et al., "Animal Tracking and Caring using RFID and IOT", IOSR Journal of Computer Engineering (IOSR-JCE), 4th—Somaiya International Conference on Technology and Information Management (SICTIM'18), K J Somaiya Institute of Management Studies and Research (SIMSR), Jan. 12, 2019, pp. 24-27 http://www.iosrjournals.org/iosr-jce/papers/Conf.17025-2017/Volume-1/5.%2024-27.pdf.

Handcock, R. N., et al., "Monitoring Animal Behaviour and Environmental Interactions Using Wireless Sensor Networks, GPS Collars and Satellite Remote Sensing", Sensors (Basel), Published online May 13, 2009, 19 Pages, 9(5) https://www.ncbi.nlm.nih.gov/pmc/articles/PMC3297144/.

Wu, T. T., et al., "Wireless Sensor Network for Cattle Monitoring System", Anforderungen an die Agrarinformatik durch Globalisierung and Klimaveränderung, 2009, pp. 173-176, Referate der 29. GIL-Jahrestagung. Universitat Trier https://strathprints.strath.ac.uk/14614/.

Herlands, W., et al., "Gaussian Process Subset Scanning for Anomalous Pattern Detection in Non-iid Data", Proceedings of the 21st International Conference on Artificial Intelligence and Statistics (AISTATS) 2018, Apr. 4, 2018, 11 pages, PMLR: vol. 84, Lanzarote, Spain.

* cited by examiner

US 10,993,417 B2

DETECTION AND MANAGEMENT OF DISEASE OUTBREAKS IN LIVESTOCK USING HEALTH GRAPH NETWORKS

BACKGROUND

The present application relates generally to computers and computer applications, and more particularly to Internet of Things (IoT) devices and computer-implemented detection and management of livestock via the Internet of Things devices and augmented reality (AR).

IoT includes interrelated computing devices or a network of physical objects. An IoT device has an Internet Protocol (IP) address for internet connectivity for communicating with other IoT devices and other Internet-enabled devices. In an aspect, IoT devices communicate with one another without human intervention, and can share or communicate various types of data.

AR provides an experience of an environment where real-world objects are augmented (e.g., superimposed) with computer-generated data (e.g., images, text, graphics, or other information), for example, in computer vision, visualization processing and/or other sensory modalities. An AR device such as an AR glass can be worn for the user to experience AR. In another aspect, AR can be provided via devices which may include displays, e.g., via mobile app on a mobile device, or another computer-implemented device.

BRIEF SUMMARY

A method and system may be provided to build a computer-implement network and to detect anomaly in a livestock, for example, based on the network. A computer-implemented method, in one aspect, may include analyzing sensor data captured over time associated with a plurality of livestock animals. The method may also include determining a health condition associated with a plurality of livestock animals based on the analyzing. The method may further include determining interactions of the livestock animals based on the analyzing, the interactions specifying at least a distance between the live stock animals, a duration of the distance, and a frequency of the distance interactions. The method may also include building a health graph network, wherein a node in the network representing a livestock animal and specifying at least a health condition of the represented livestock animal, an edge connecting at least two of the nodes and representing an interaction between at least two animals represented by said at least two of the nodes. The method may also include, based on the health graph network, predicting a potential outbreak among a subgroup of the livestock animals.

A computer-implemented system, in one aspect, may include a hardware processor. A memory device may be coupled to the hardware processor. The hardware processor may be operable to analyze sensor data captured over time associated with a plurality of livestock animals. The hardware processor may be further operable to determine health condition associated with the plurality of livestock animals based on the analyzing. The hardware processor may be further operable to determine interactions of the livestock animals based on the analyzing, the interactions specifying at least a distance between the livestock animals, a duration of maintaining the distance, and a frequency of the distance interactions. The hardware processor may be further operable to build a health graph network wherein a node in the graph network representing a livestock animal and specifying at least a health condition of the represented livestock animal, an edge in the graph network connecting at least two of the nodes and representing an interaction between at least two animals represented by said at least two of the nodes. The hardware processor may be further operable to, based on the health graph network, predict a potential outbreak among a subgroup of the livestock animals.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Livestock can be monitored with an Internet of Things (IoT) based system to track the health condition, mobility patterns, and interactions between animals. A computer system may be used to detect outbreaks of disease, and manage subsequent outbreaks, e.g., by informing the farmer which animals have been exposed to an infected animal. By analyzing the IoT feed (e.g., real-time data about the movement of one or more animals), the system can identify whether any livestock is deviating from their known normal/health daily routine or behavior (e.g., average behavior), and the degree of deviation. The degree of deviation implies the degree of health level of an animal.

Tracking of livestock may include: behavioral movement, interaction patterns between animals, sequence of activities and time frames, responses to external stimulating factors like whether weather related conditions such as the wind and rain, and the presence of predators. In some cases, the degree of deviation of an individual animal may not be a cause for concern, but the deviation occurring in several connected or related animals may suggest a problem.

By monitoring or tracking the interactions between animals (e.g., proximity, frequency, duration), the system can measure the connectivity between animals, and thereby identify anomalous groups of animals. In one aspect, the system may trigger by sending a trigger event (e.g., an alert, notification, a message code, etc.) to the augmented reality glasses (or like technology) to display the current status of the animals for the livestock farmer when the deviation value is above a predefined threshold value. The livestock farmer can use augmented reality glasses to visualize the current status of the animals, the predicted activities of the animals, and the connectivity between animals. This information can help the livestock farmer to take appropriate action or prepare for appropriate action in a proactive manner.

Consider the following hypothetical scenario: A farmer has 1000 cows on his farm. The farmer uses an IoT device to monitor the health and interactions of the cows, and one of the measurements is the number of steps that each cow takes in a given day. On average, a cow takes 10 000 steps in a day. If the farmer detects that a cow only took 5000 steps in a day, then this may indicate that the individual cow is sick. However, a smaller deviation such as a small deviation from the mean, for example, a cow took 8000 steps in a day, most likely may not be of concern to the farmer. But if the farmer detects that 10 cows that had all been grazing together all took less than 8000 steps, then this may suggest a problem. Such collective behavior may signal a problem such as in a feed that the cows all had, beginning of an infectious disease outbreak, and/or another health related event.

Figure 1:
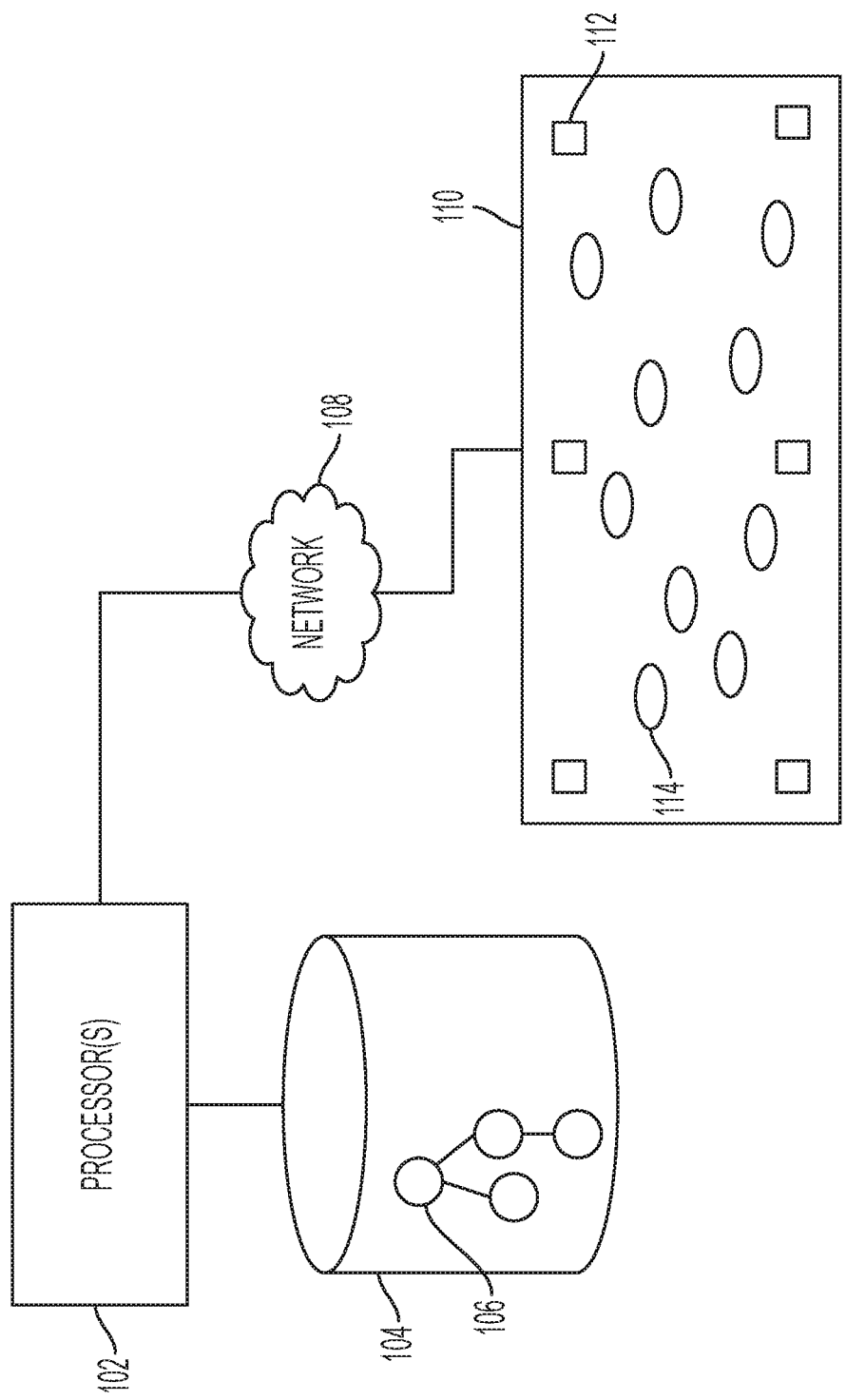
FIG. 1 is a diagram illustrating components of a system in an embodiment.

Systems, methods and techniques may detect and manage disease outbreaks in livestock. In embodiments, a system and/or method may use health graph networks. FIG. 1 is a diagram illustrating components of a system in an embodiment. The system, for example, may include one or more processors 102, for example, components such as programmable logic devices, microcontrollers, memory devices, and/or other hardware components, which may be configured to perform respective tasks described in the present disclosure. The system can also be communicatively coupled to a network of IoT sensors or devices. For instance, a farm 110 or like area may include a plurality of animals such as livestock animals fitted with one or more sensor devices 114 (denoted by oval shapes). The farm 110 or like area may also include sensors 112 (denoted by rectangular shapes) installed on fixed locations in the farm or the area. The livestock animals fitted with sensors 114 may move around in the farm 110. The system (e.g., one or more processors 102) may receive or obtain data associated with the measure of the health condition, mobility patterns, and interactions of every animal in a plurality of animals being considered, with respect to surrounding context, time frame, external stimulation, and/or other information pertaining to the animal, for example, via the IoT sensor network. In one aspect, the sensors 112 and 114 may communicate data via a network 108 to one or more processors 102. In another aspect, an IoT server (not shown) may receive the data from the sensors 112 and 114, and perform preprocessing on the data (e.g., formatting into common or standard data format) and communicate the data to one or more processors 102.

Based on the measurements, the system (e.g., one or more processors 102) may generate or build a health and behavior profile of each individual animal. The system may also generate or build a health graph network 106 from the interactions between animals, which the system may store in one or more storage devices 104, for example, in a database. The health graph network 106 may be implemented as nodes or vertices connected by edges, for example, represented as a data structure stored on a memory partition of a memory device. The system may enable farmers or any relevant actor in the livestock value chain to visualize connections and interactions between animals based on the health graph network on AR glasses.

In an embodiment, each node of the health graph network represents one animal. A data structure can implement a node. The nodes can store behavioral and health data about an animal, which can be used to infer the overall health of the animal. A data structure can implement a node, and can include attribute-value pairs. The data may include, but not limited to: number of steps taken in a period of time (e.g., 1 day, 1 hour, or another configured time period); amount of time spent lying down; body temperature of the animal; amount of food or consumed by the animal; heart rate of the animal, and/or electrocardiogram respiratory rate of the animal; blood oxygen saturation; blood pressure; blood glucose; skin perspiration. In addition, the node may store data about the ambient environment, e.g., the temperature, wind speed, rain, ultraviolet (UV) index, etc.

The data can be used to calculate the overall health of the animal, which can be represented by an attribute to denote the degree of health, computed from the degree of deviation. For instance, for visualization, a visual attribute (e.g., pixel value associated with a pixel a graphic image) can be associated with the node in the health graph network. The value of the attribute can have a range. For example, the pixel value may range from black (or green or another) for a healthy animal, to yellow (or another) for an animal displaying mild symptom of disease, to red (or another) for an unhealthy animal.

The edges of the graph (e.g., lines connecting the nodes) represent the interactions between animals. A data structure that represents a node can have a link, pointer or reference to another node, for representing an edge. The interactions can be inferred from the following data: proximity of animals to each other during a period of time; frequency of interactions between animal; duration of these interactions. An edge can have an attribute and value pair, for example, a strength attribute and associated value to specify or indicate the strength of connection between the two vertices. For instance, more interactions between the animals, the stronger the connection. Visually, strength or degree of interaction can be denoted with different visualizations, for example, pixel shading, thickness of a line representing an edge, and/or another graphic notation for visual display.

In an embodiment, the data structure may capture the data at intervals of time. In another embodiment, the data structure can capture the data at a specified point in time. For example, the health graph can be computed at a particular point in time, for instance, based on the data captured at the particular point in time. The health graph may be also computed based on an average of data points captured over previous time steps (for example, a predefined past period of time). The health graph may be also computed based on an average of data points captured over previous time steps with exponential moving average (e.g., considering more recently captured data with higher weight).

The system (e.g., one or more processors 102) may further recognize changes in health and behavior of an individual animal from its normal profile, and measure a degree of deviation. The system (e.g., one or more processors 102) may detect one or more anomalous sub groups of animals from the health graph network. From the anomalous sub groups of animals the system may infer a disease outbreak. The system may further identify animals that have been exposed to infected animals, and recommend an action such as recommending isolation of those animals. Further based on identified and/or predicted behavioral and activity related parameters of the livestock animals, the system may recommend one or more actions to be taken. The system may further visualize the health of individual animals and the health graph network, for example, by utilizing augmented reality technology and/or device such as glasses. Via the augmented reality technique and device, the system may allow farmers or interested actor to visualize the historical movement of animals, for example, in the augmented reality glasses, and visualize the predicted next movement of the animals (e.g., moving toward water source). The system may also allow for visualizing the deviation from the established profile.

Figure 8:
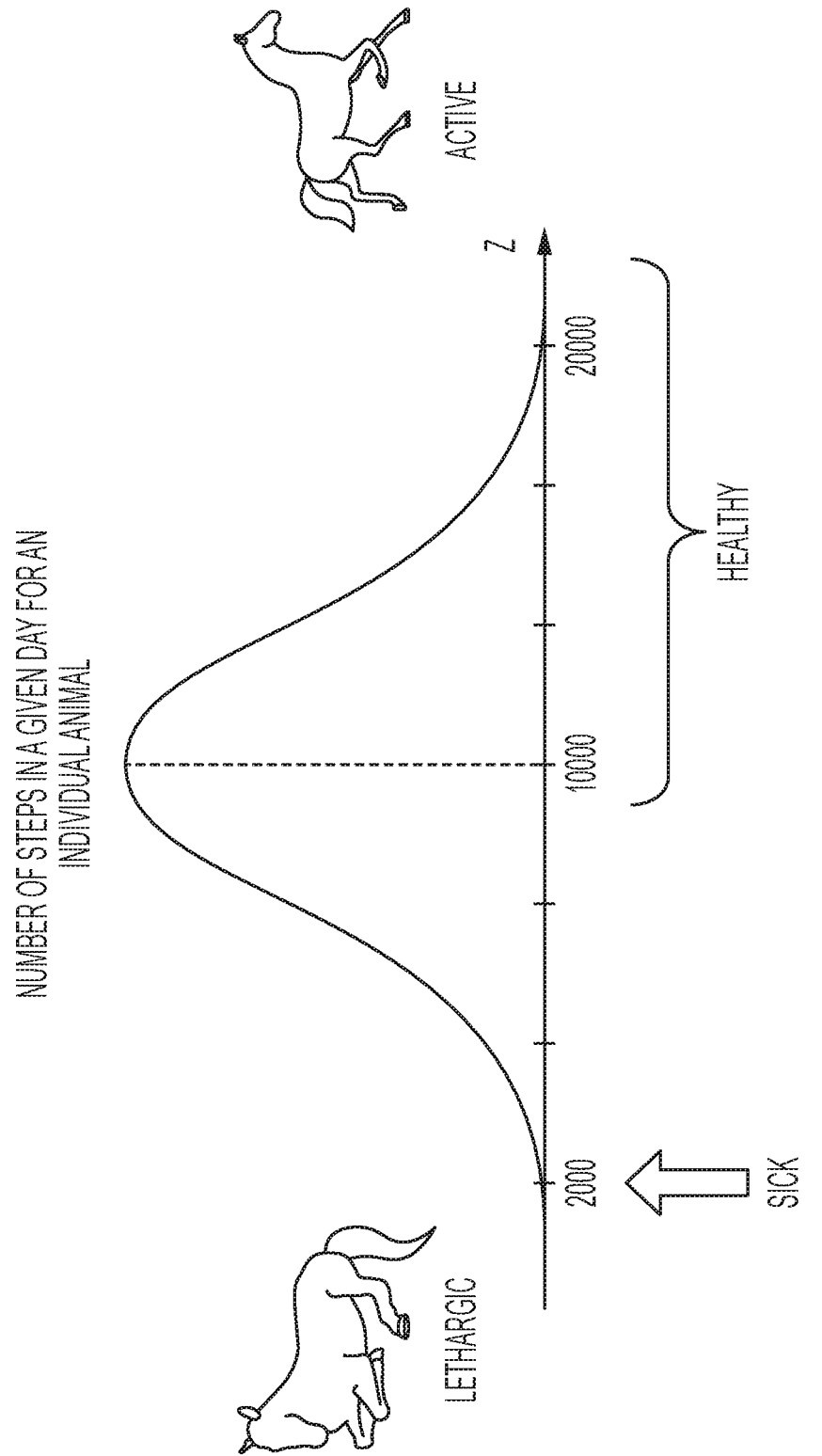
FIG. 8 shows an example of identifying an animal's deviation from their known normal/health daily routine in one embodiment.

FIG. 8 shows an example of identifying an animal's deviation from daily known normal/healthy routine in one embodiment. The degree of deviation implies the degree of health level of an animal. By way of example, a farm animal may on average take 10,000 steps in a day, with a standard deviation of +/−2,000 steps. If the farm animal takes 2,000 steps in one day, which represents a large deviation from the typical behavior of that farm animal, it is a likely indication that the farm animal is sick. Similar rational may be applied to other parameters, for example, food intake and body temperature.

In an embodiment, each animal in a plurality of animals (e.g., livestock) may be fitted with an IoT device (e.g., 114), which can measure or detect data associated with the health condition of the animal, the movement, and the interactions between the animals. Such IoT device may be in the form of a wireless sensor network tag. Examples of a wireless sensor network tag may include but are not limited to radio frequency identification (RFID) tag. Another example of IoT device, which can measure or monitor the health of an individual animal may include, but is not limited to, biosensors such as nano biosensors, sensors for microfluidics, sensors for sound analytics other wearable technologies for animals. A location-enabled device such as a GPS-enabled device can detect and measure the movement of an animal.

The system (e.g., one or more processors 102) in an embodiment can also monitor the interactions between animals. For example, the system may measure or determine the proximity of animals to one another (e.g., in distance such as meters, feet, or another measurement unit), the duration of the interactions (e.g., in time units, e.g., measuring how long the animals have been within a threshold distance from one another), and the frequency of the interactions (e.g., how many times per day (or another period) the animals have been within a threshold distance of one another).

In an embodiment, the system can measure the interactions using active RF tags, which can provide an accurate measurement of the distance between animals. For example, data measured from an RF tag is fine-grained to allow for detecting animals that may be facing one another and animals that are facing away from one another. In an embodiment, RF tags can operate as follows: Each tag sends out periodic radio packets on a specific frequency; Each tag sends its own unique identification (ID) along with the radio packet; Each tag also listens out for radio beacons from other tags; Responsive to receiving a beacon, a tag may store the current time, the ID of the sender, the signal strength, and the duration for which the beacons were received is stored. A reader device can download this data (as well as additional health-related data from sensors attached to the tag) wirelessly from each tag, and can infer which tags were in close proximity to each other (e.g., from the signal strength), for how long, and when the contact occurred.

Data gathering module of the system can include a wireless sensor network. The wireless sensor network can include IoT devices such as active RF devices (referred to as RF tags or tags), referred to as radio frequency (RF) tags. In an embodiment, the RF tags are powered by a battery and contain several sensors. An RF tag can be attached to the animal, e.g., ear or tail of the animal to be tracked, and/or placed at locations of interest throughout the farm (e.g., near water sources, shelters, feeders, etc.). For example, a tag placed near a water trough can be used to tell which animals were at the trough and for how long. Location-specific tags are also referred to as "locators". One or more RF tags can periodically take measurements on its sensors (such as body temperature, GPS location, proximity to other RF tags, etc.) and communicate this data to one or more other RF tags and/or reader devices that are placed throughout the farm. This way, the sensor network can distribute the data and communicated to one or more readers. One or more readers can collate the data, process and/or upload the data.

Figure 2:
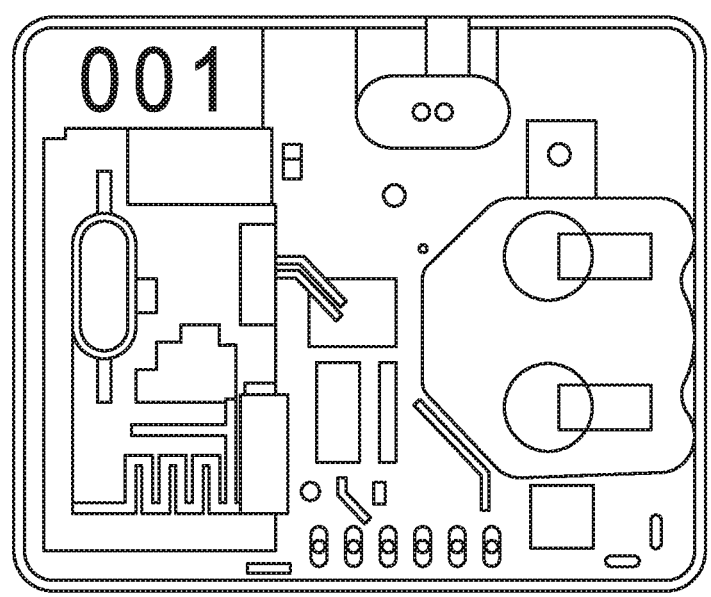
FIG. 2 illustrates an example RF tag in an embodiment.

FIG. 2 illustrates an example Radio frequency (RF) tag in an embodiment. An RF tag is an example of an IoT device in a sensor or IoT network and can be an RFID tag. Such an RF tag can be used for tracing contacts between RF tags. Additionally, RF tags can include health-related sensors like accelerometer for movement sensing, thermometer for gauging temperature, heart rate sensor and/or other sensors. An RF tag can have an integrated circuit (IC) (also referred to as a microchip or chip, e.g., a microprocessor with memory to store data), an antenna, and a substrate. An RF tag may also have power source. Such RF tags can be clipped for example, to the ear lobe of an animal and also placed around points of interest such as watering holes, troughs, feeders, fences, and/or other locations. The RF tags can collect time-stamped data, contacts, duration of contact and strength of signal which can indicate proximity.

The animals' bodies attenuate the radio frequency signal, which allows the proximity detection to ignore animals that are facing away from each other. For instance, the radio signals are blocked by the body of the animals, and so if placed near the head (e.g., collar), a strong signal can only be received between animals generally facing each other, than away from each other. For the locations of interest, tags can be placed with known ID's at known locations (e.g., a feeder). If the animal is near the feeder (as indicated by received signal strength, also known as Received Signal Strength Indicator (RSSI)), then the data on the animal's tag (and the locator tag at the feeder) will contain the data about this event. From such data, it can be inferred when (e.g., time) and for how long the animal was at the feeder. Such a technique allows for a low cost, but fine-grained sensor for detecting contact patterns between animals, and between animals and the locations of interest.

The system in an embodiment may compute a "connectivity" or connectivity patterns between animals from the historical interactions between animals. The system may compute the "connectivity" to be proportional to proximity, duration, and frequency of contact (e.g., number of times the animals came within a given proximity or distance for a given duration), for example, a function of those factors. In an embodiment, the system may prioritize more recent interactions between animals in computing the connectivity measure between animals. For instance, the connectivity measure may incorporate an exponential decay function based on recency.

By way of example, the connectivity may be computed by integrating the proximity between two or more animals over time. For example, all the proximity measurement can be added together over a period of time from t_0 to t_1. The added measurement can be normalized by the length of the time period T.

As another example, the connectivity may be computed as a linearly weighted combination of the individual factors such as the average proximity between two or more animals over a time period T and the average duration of interactions between two animals over a time period T. An interaction may be defined to begin when two animals are closer together than a distance threshold Th (which can be pre-defined or configured), and end when two animal move further apart than the distance threshold Th. The number of interactions between two or more animals at time period t can be defined by the number of times that two or more animals are closer together than the distance threshold Th for a given duration.

Figure 3:
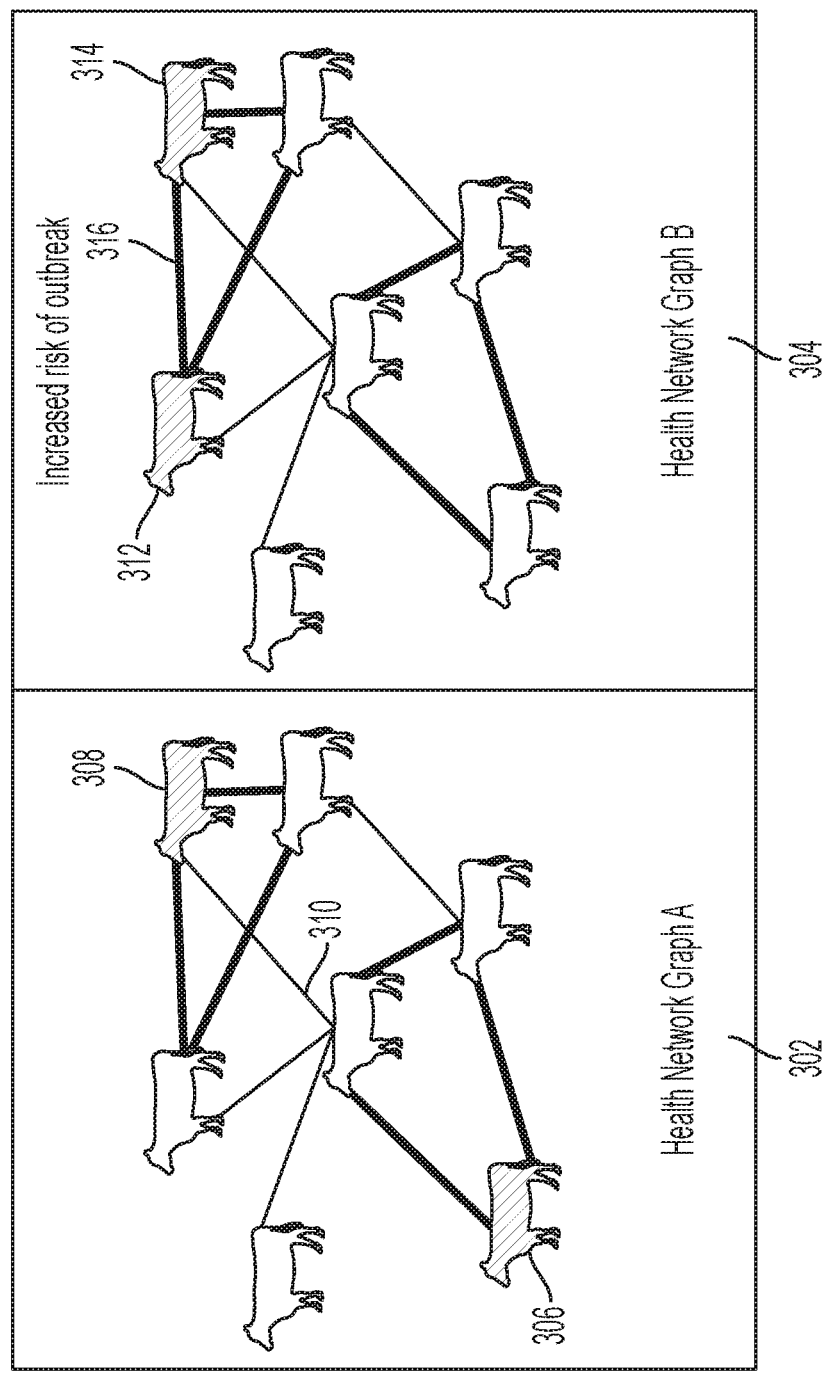
FIG. 3 shows a network with nodes showing health of each animal and edges showing connectivity between animals in embodiment.

FIG. 3 shows a "health graph network" with nodes showing the health of each animal and the edges showing the connectivity between animals. For instance, a node or vertex of the health graph network can represent an animal (e.g., a cow as shown or another animal). The health of an animal can be an attribute of a node, and determined from the captured IoT data which can be monitored continuously or continually. The connections between the nodes can be determined based on the interactions monitored of the represented animals, e.g., how closely in distance they are located. In Graph A 302 the two animals showing symptoms 306, 308 are not strongly connected as shown by at least the line ("edge") at 310. In Graph B 304 the two animals 312, 314 showing symptoms are directly connected as shown by the line "edge" at 316. In this example, the health graph network may be searched for anomalous groups of animals, for example, using a subset scanning technique. An anomalous group of connected animals detected in the health graph network may indicate an increased risk of outbreak of disease.

Figure 9:
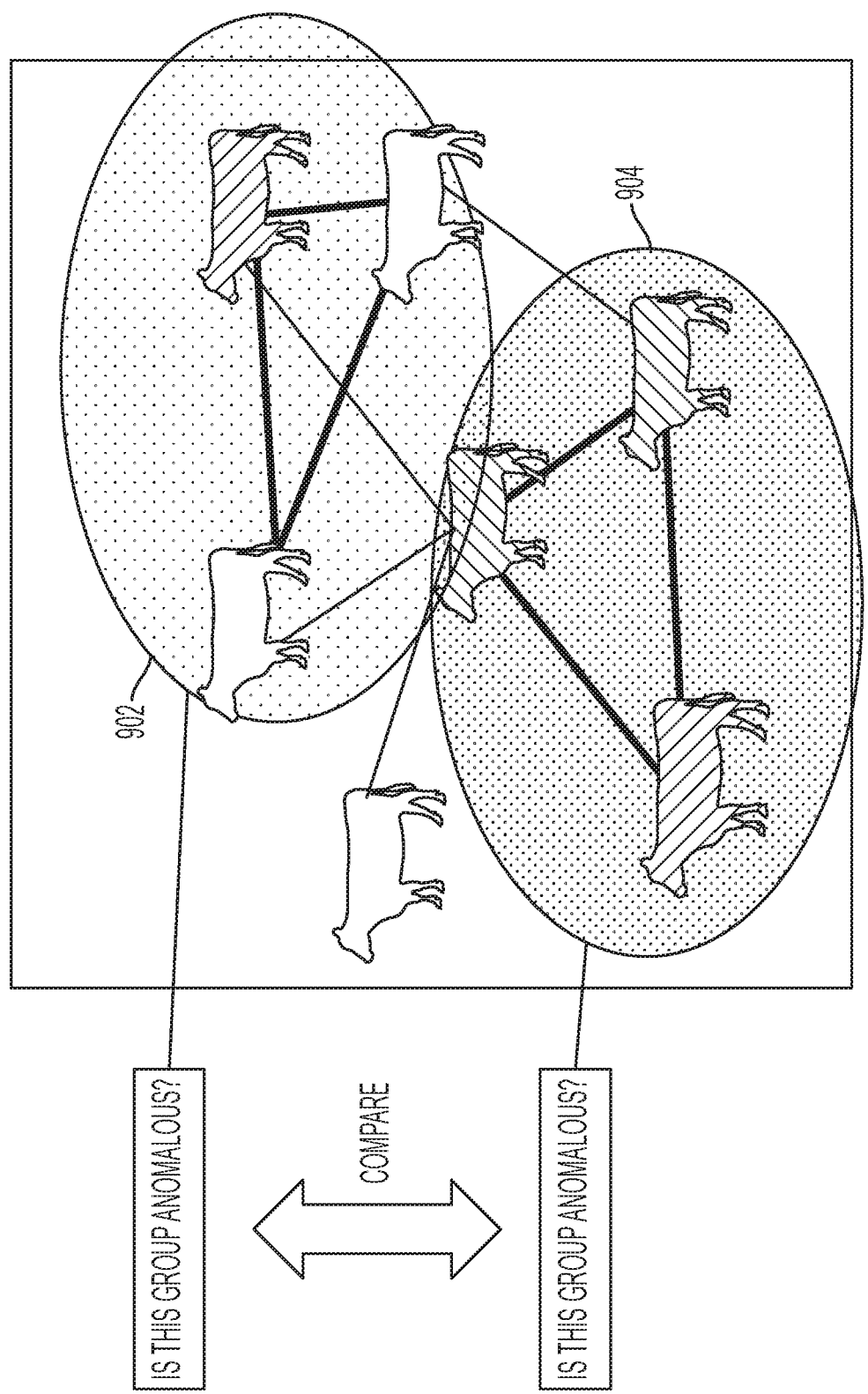
FIG. 9 is a diagram illustrating a subset scanning to detect anomalous subgroups of connected animals in one embodiment.

Briefly, a subset scanning technique or method is a variation of statistical machine learning method suited to identify anomalous patterns in real-world data by characterizing and understanding where, when, and how observed phenomena (e.g., of systems) deviate from their expected dynamics. More specifically, anomalous pattern detection includes a task of identifying subsets of data points that systematically differ from the underlying model. In the spatiotemporal domain, timely identification of such patterns can allow for effective interventions. In an embodiment, the system in the present disclosure may use a variation of the subset scanning algorithm to identify, detect and characterize anomalous group of connected animals in the health graph network. The quantified anomalousness score may indicate an increased risk of outbreak of disease. FIG. 9 is a diagram illustrating a subset scanning method used to detect anomalous subgroups of connected animals in one embodiment. A subgroup 902 can be identified, e.g., based on their connections, and compared with another subgroup 904.

Figure 10:
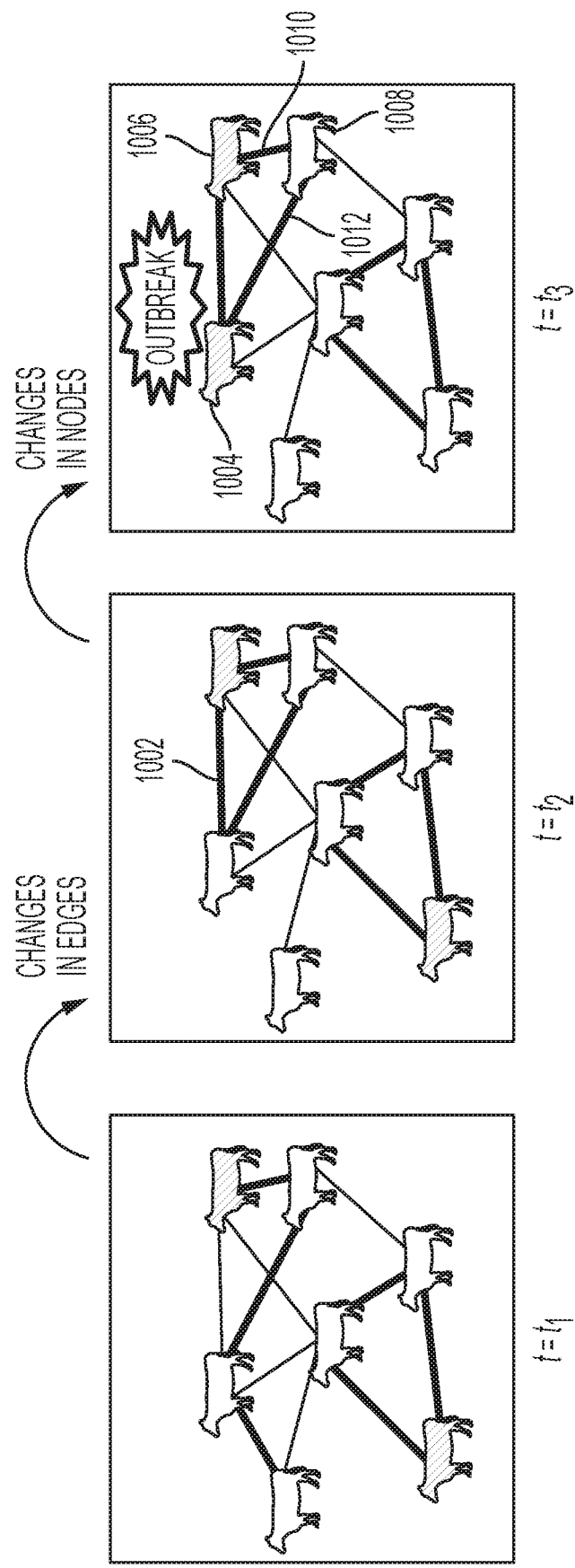
FIG. 10 shows monitoring changes in health graph network over time in one embodiment.

FIG. 10 shows monitoring changes in health graph network over time in one embodiment. From time t=t_1 to time t=t_2, a change in the interaction of the nodes is observed as shown at 1002. From time t=t_2 to t=t_3, change in a node 1004 is observed. Based on the health attribute of nodes 1004 and 1006 and their interactions, an outbreak may be inferred. In addition, it is observed that node 1008 may also be at risk, for example, based on the interactions denoted by edge 1010 with node 1006 and edge 1012 with node 1004.

Figure 11:
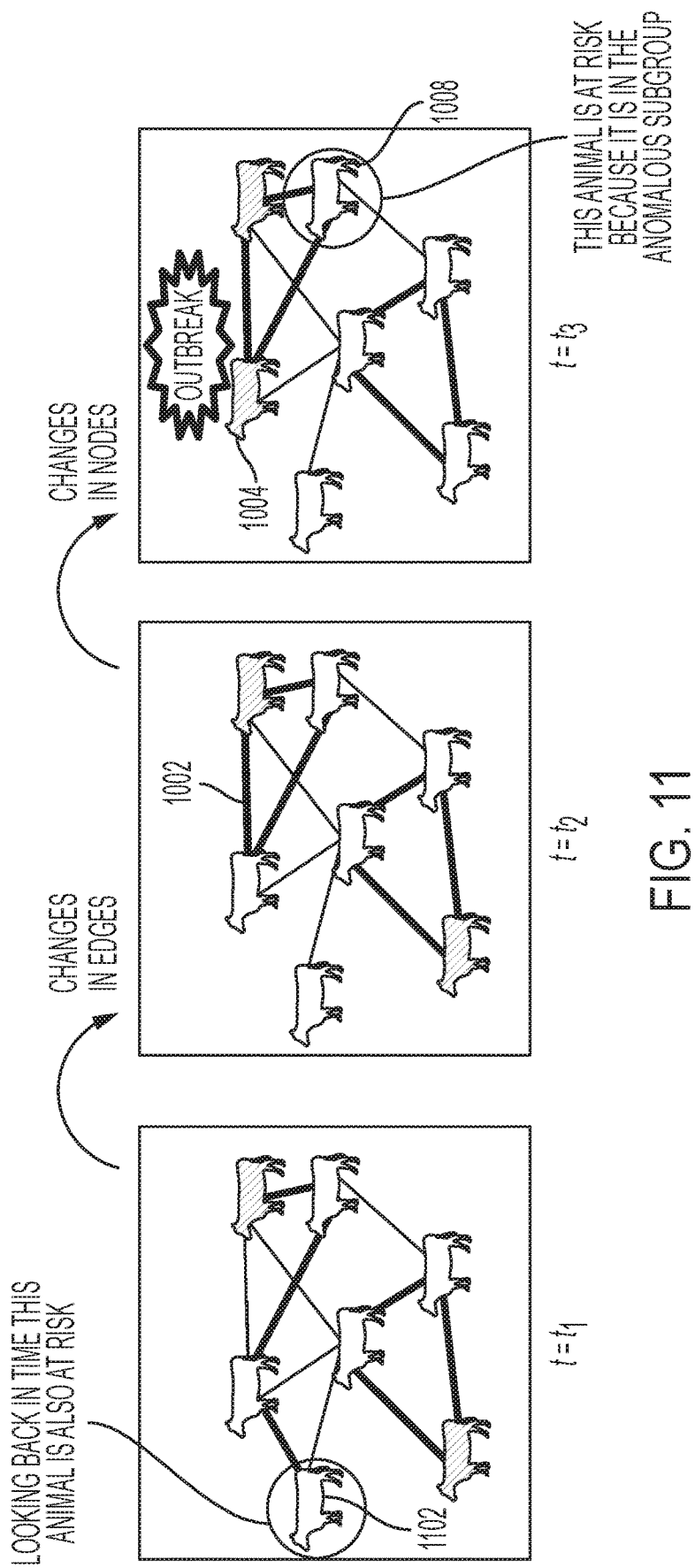
FIG. 11 shows an example scenario of "back-tracing" in one embodiment.

In an embodiment, the system may use the health graph network in the case of "back-tracing" of disease. For example, in the event of an infectious disease outbreak, it may be necessary to isolate the effected animals, and quarantine or even cull the effected animals in order to prevent the disease from spreading further. In an embodiment, responsive to an occurrence of an infectious disease outbreak, by looking at the health graph network, the system may determine the interactions between animals over time and identify which animal came into contact with an infected animal, and thereby identify which animals may have contracted the disease. Such a technique may potentially save animals from being culled unnecessarily, for instance, in cases in which the protocol to contain an outbreak is to cull all the animals on a particular farm. FIG. 11 shows an example scenario of "back-tracing" in one embodiment. At time t=t_3, it is observed that the node 1008 may be at risk, for example, based on interactions with other nodes which are considered at risk. Tracing back to t=t_1, it is also observed that node 1102 also interacted with node 1008 at t=t_1, and hence it may be determined that node 1102 may also be at risk.

In an embodiment, the system may include an augmented reality (AR) based monitoring of livestock, which may show an action to be performed by a livestock farmer or like, visualizing the predicted activities of the livestock animals based on change in surrounding context.

Figure 4:
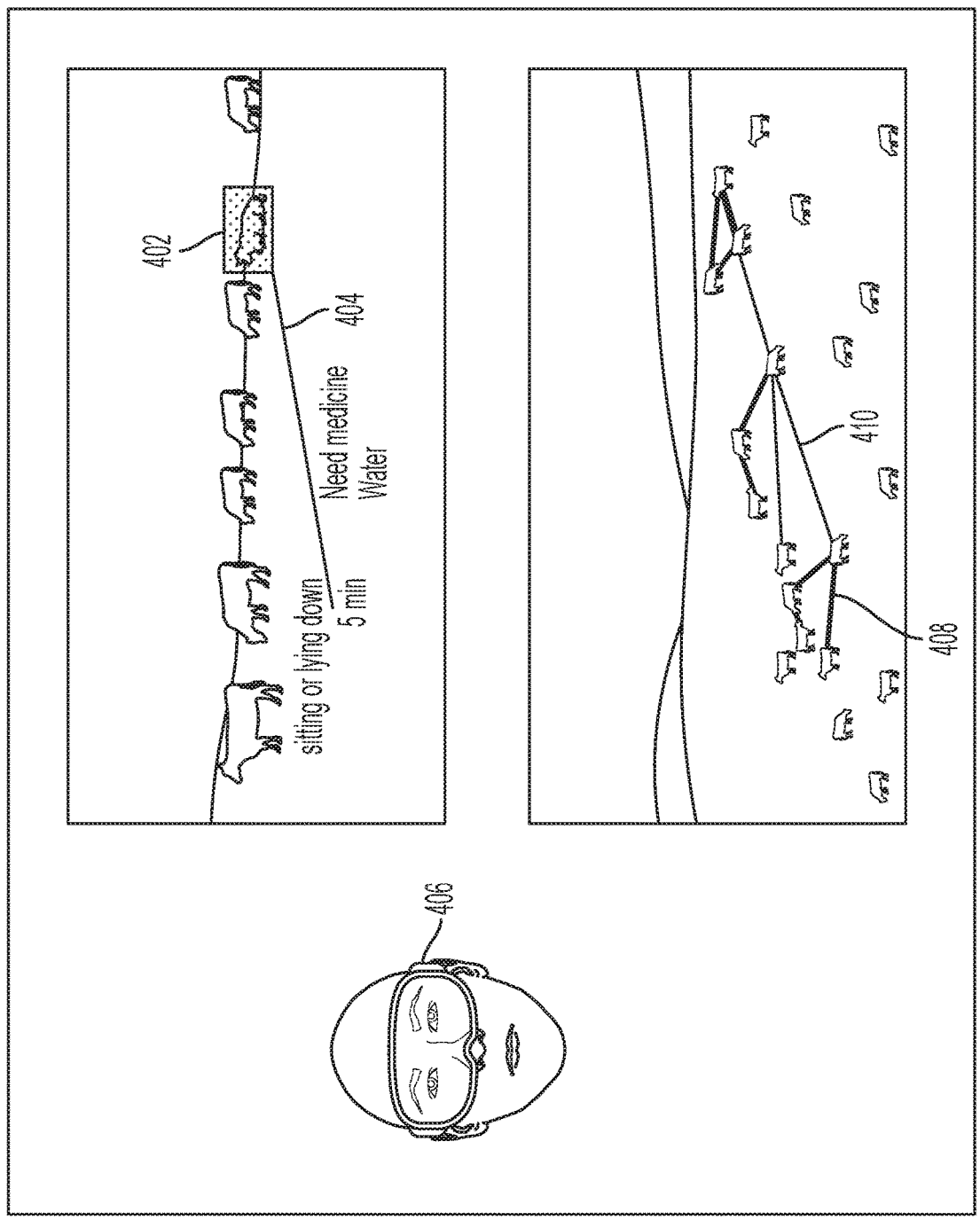
FIG. 4 shows augmented reality in an embodiment.

FIG. 4 shows augmented reality for visualizing current health status of animals, predicted movements, and recommended actions for a farmer to take. For instance, a visual attribute (e.g., pixel value) of the bounding box 402 may indicate the health of the animal, and the system may recommend an intervention to the farmer or concerned individuals (e.g., veterinary) which may appear as text in the augmented reality viewer, for example "Need medicine and water". Furthermore, the augmented reality system may display the predicted movement path of the animal, and a prediction of the animal's activity in the future. For instance, the animal 402 is predicted to travel the path shown at 404, and is predicted to be sitting or lying down in a future time, for example, in 5 minutes. The prediction can be determined, for example, by creating a machine learning model such as a regression model fitted with historical data, a neural network model trained based on historical data, and/or based on another prediction algorithm. Augmented reality can be provided for visualizing connectivity between animals. For example, via an augmented reality glass 406 or another such device, a user is enabled to view connectivity 408, 410 (e.g., with different visual attributes that indicate health status) among animals. Such connectivity can be overlaid or augmented over a real view of the farm as shown.

In an embodiment, the system is a sensor-based system. For example, one or more sensors can be attached with an animal, for example, one or more animals in a farm or a livestock. Each of the sensors can be configured to be identified uniquely, for example, to have a unique identification. Camera-based system such as drone or drone swarm can also be used for tracking the livestock animals.

Each sensor can be tagged with individual livestock animal; one livestock animal can have multiple sensors, for example, a movement sensor (e.g., a motion sensor), a position sensor (e.g., a GPS-enabled sensor), a proximity sensor (e.g., implemented as part of a radio-frequency tag, which detects proximity by sending and receiving radio frequency beacons and noting the received signal strength to determine how close the tags are to each other), a temperature sensor (e.g., a thermometer), a camera, and/or another sensor. In an embodiment, an RF tag (e.g., shown in FIG. 2) can integrate such multiple sensors.

The system in an embodiment may capture the sensor feed (e.g., IoT feed) from the animals over a network such as a wireless network and may store the captured data. For instance, the captured data may be stored in a storage devices associated with a server.

In an embodiment, the system may also capture various other information related to surrounding context, like weather, availability of food, offspring and parent information, and/or other information. For different surrounding context, the mobility, activity and behavior of the livestock animals can also be different. The system may continuously or periodically capture the data from each animal.

The system may perform analytics on the captured data. For instance, the system may perform unsupervised clustering algorithm classification of the sensor feed. Such unsupervised clustering may classify a mobility pattern of a livestock animal in different contextual situation; relationship among the animals, like offspring and parent relationship, and relative proximity between the offspring and parent; change in behavior of livestock because of movement of offspring, availability of food, health condition, and/or weather condition; activity sequence of the animals on a daily basis (e.g., activity of animal when there is food for consumption, what activity is performed after having food); deviation from normal behavior of a livestock animal (e.g., change in speed of movement, moving out from herd of livestock, not drinking water).

In an embodiment, machine learning, such as deep neural network model and regression model, can be performed on the captured or gathered data, and knowledge corpus can be created by correcting various parameters such as, but not limited to: Change in behavior of any livestock animal based on change in surrounding context; Reaction of any livestock animal in different contextual situation; Activity and routine of livestock animal on daily basis; Causes of deviation from the daily (e.g., usual) routine or condition, such as but not limited to, health, food. Deviations from such daily routine or condition can be determined based on monitoring measurements over time. Causes of such deviation can be performed based one or more causality analysis and also inferred based on analysis of back tracing interactions over time.

The knowledge corpus (e.g., heath network graph, machine learning model) can be used to predict livestock animal's activities based on any identified context.

Responsive to an occurrence of an event such as an outbreak, a minimal threshold amount of animals can be treated in order to bring the outbreak under control. The minimal threshold can be a value configurable by the system or by a domain expert user (e.g., a veterinary) of the system. An example of a treatment can include, but not limited to, vaccination.

In an embodiment, using the health graph network, the system can detect a nucleus or source based on interactions specified in the health graph network.

In an embodiment, the system may provide an augmented reality experience to a farmer or the like. For example, livestock farmers can use an augmented reality glass. The system may connect augmented reality functionality to the knowledge corpus to retrieve or obtain relevant information for providing the augmented reality experience. Briefly, augmented reality superimposes a computer-generate image on a user's view of the real world environment, for example, objects in the real-world, providing a composite view of the real world objects and computer generated image.

In an embodiment, the system may continuously receive and/or capture sensor and camera feed of each livestock animal. Bases on the analysis of the sensor and camera feed, the position of each livestock animal in the farmhouse may also be identified. Alternatively, remote sensing data (e.g., satellite data), geospatial data, etc. can be used to identify the position of each livestock animal. The system may use the relative position of unique sensors to detect the position of the livestock animals. The system may further analyze the sensor and camera feed from each of the livestock animals to identify various parameters associated with each livestock animal. Parameters may include, but are not limited to: Average behavior of each livestock animal, e.g., daily routine behavior, contextual situation based behavior; Change in behavior based on change in health condition; Change in behavior based on food intake pattern, position and activities.

For example, the system may analyze the current IoT sensor feed of each livestock animal and may predicting the activity or change in behavior, which can be observed with each animal based on surrounding context. The system may predict whether any livestock animal will exhibit any negative behavior which needs to be addressed. Such predicted livestock can be tagged or highlight in augmented reality visualization, for example, in augmented reality glass worn by or used by a livestock farmer.

Using the knowledge corpus, the system may predict what activity a livestock animal will be performing next and the prediction may be show in a timescale or timeline, for example, on AR glasses, including future timescale or timeline, such that a proactive action can be taken. The system may show one or more types of activities a livestock farmer can perform considering how different livestock animals are behaving, acting and/or predicted to behave. Based on assigned activities, or area of work a livestock farmer is recommended to perform, the system may provide augmented reality experience, which highlights livestock animals associated with an action is to be performed.

Figure 5:
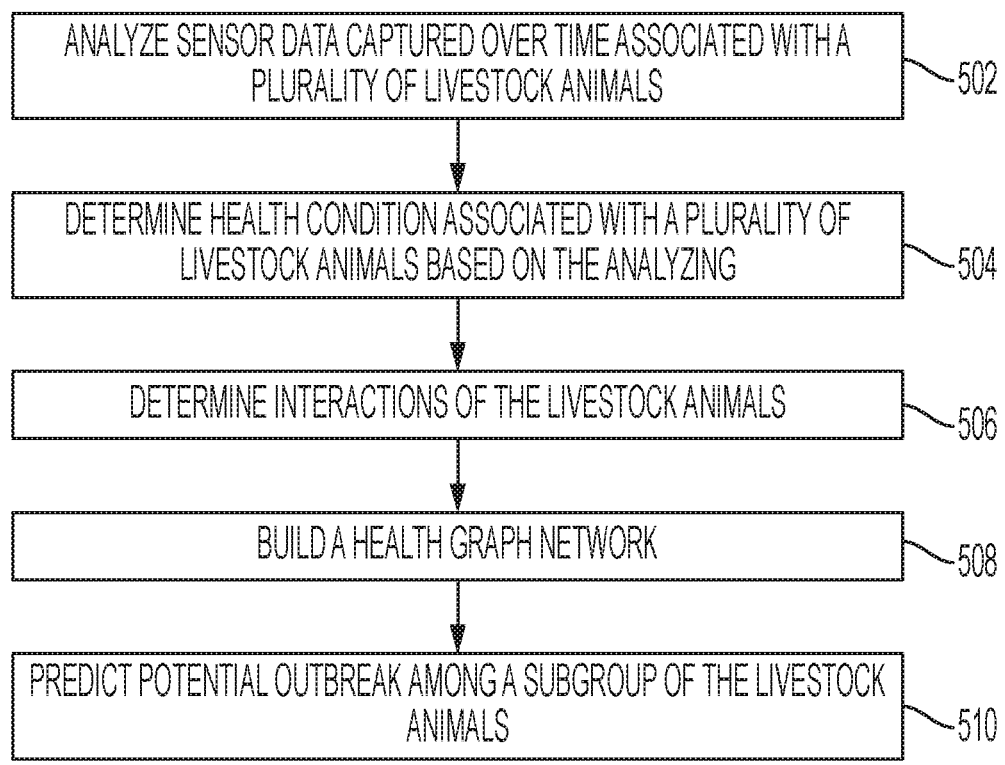
FIG. 5 is a diagram illustrating a method in an embodiment.

FIG. 5 is a diagram illustrating a method in an embodiment. The method may be executed by one or more hardware processors. One or more hardware processors can be operatively connected or coupled to one or more memory devices. At 502, the method may include analyzing sensor data captured over time, which sensor data is associated with a plurality of livestock animals. For example, livestock animals can be fitted with one or more IoT devices such as an RF tag, and the IoT feed can be analyzed to identify if any livestock is deviating from their daily routine or behavior. The degree of deviation can also be determined. IoT feed may also include sensor data from IoT devices installed in locations of an area such as a farm where the animals are grazing or moving around.

At 504, health condition associated with a livestock animal (e.g., for each of the plurality of livestock animals) can be determined based on identifying whether the livestock animal is deviating from their daily routine or behavior, and for example, from the degree of deviation.

At 506, the method may also include determining interactions or interaction patterns of the livestock animals. For instance, interactions or interaction patterns can be described or measured by the distance between the livestock animal, for example, a pair of animals for a plurality of pairs; the duration of that distance, for example, for how long a pair of animals has been within that distance (or within a threshold distance); the frequency of distance, for example, how many times a pair of animals has been within that distance (or a threshold distance) per period such as per day or another period of time.

At 508, the method includes generating, constructing or building a health graph network from interactions patterns between animals (e.g., proximity, frequency, duration).

At 508, the method can include inferring one or more outbreaks of disease from anomalous subgroups of connected animals, for example, using the health graph network. For instance, if a group of animals within a threshold proximity or distance have been behaving outside of their daily routine or behavior, for example, their health condition, it may be inferred that there can be a potential outbreak.

The method may also include back tracing interactions specified in the health graph network over time to identify animals that have come into contact with an infected animal. In another aspect, the method may also include identifying animals or group of animals that have been exposed to infected animals by predicting or estimating the movement path of the livestock in a time scale, activity and behavior. The method may also include recommending an amelioration action (e.g., isolation of these animals by analyzing anomalous subgroups). In an embodiment, augmented reality glasses may be used to visualize the predicted activities of the animals, and the connectivity between animals. This information can help the livestock farmer or veterinary to take an appropriate action or prepare for an appropriate action in a proactive manner.

In an embodiment, the method may define or identify the subgroups by measuring the interactions between animals, and constructing a health graph network based on these interactions. In this way, the method can define subgroups in a dynamic way, for example, the subgroups can change over time. In an embodiment, the method may use a soft threshold approach, whereby the grouping buckets are determined dynamically by comparing across different subgroups.

Figure 6:
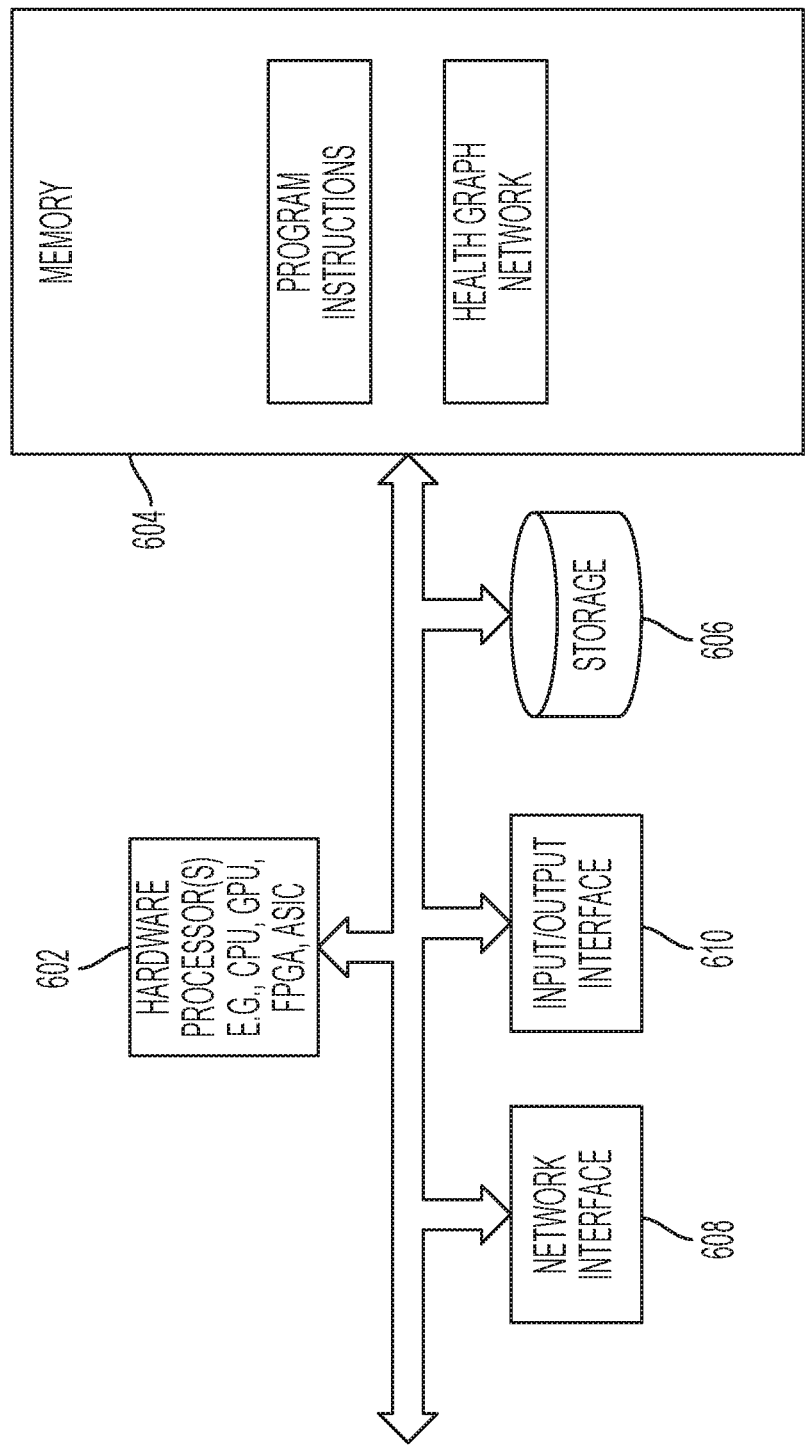
FIG. 6 is a diagram showing components of a system in an embodiment, which may detect and manage disease outbreaks in livestock using health graph network.

FIG. 6 is a diagram showing components of a system in an embodiment, which may detect and manage disease outbreaks in livestock using health graph network. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and generate a health graph network. The health graph network can be updated in real-time based on real-time measurements from IoT devices associated with livestock. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive input such as the IoT data. For instance, at least one hardware processor 602 may generate a health graph network, which may be used to predict an outbreak and recommend an appropriate action. In one aspect, input data may be stored in a storage device 606 or received via a network interface 608 from a remote device, and may be temporarily loaded into a memory device 604 for building or generating the health graph network. The generated health graph network may be stored on a memory device 604, for example, for use in determining or predicting an outbreak, and/or back tracing one or more sources and/or intermediaries by one or more hardware processors 602. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
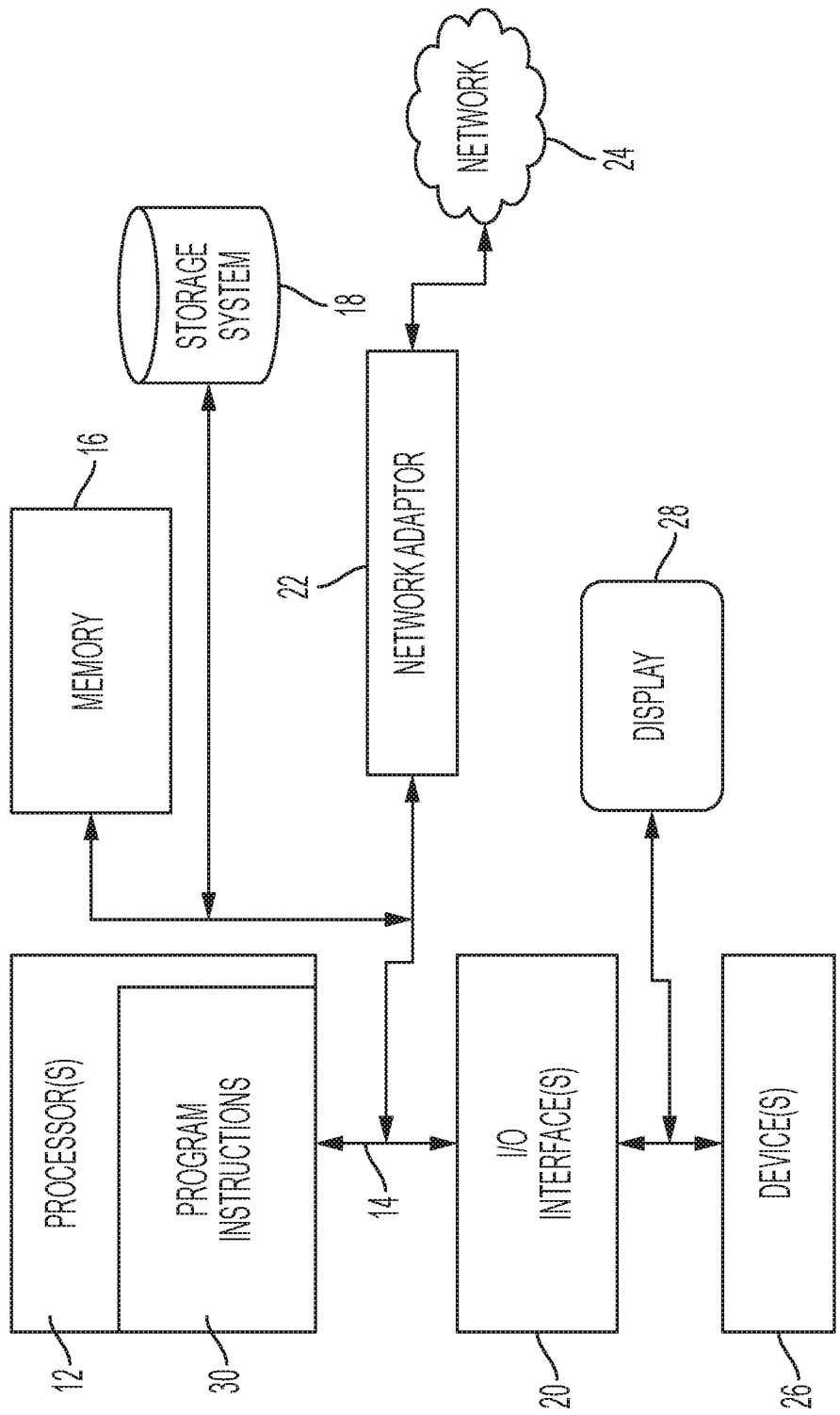
FIG. 7 illustrates a schematic of an example computer or processing system that may implement a system in an embodiment according to the present disclosure.

FIG. 7 illustrates a schematic of an example computer or processing system that may implement a system in one embodiment according to the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method comprising:
analyzing sensor data captured over time associated with a plurality of livestock animals;
determining a health condition associated with a plurality of livestock animals based on the analyzing;
determining interactions of the livestock animals based on the analyzing, the interactions specifying at least a distance between the livestock animals, a duration of the distance, and a frequency of the interactions;
building a health graph network including at least nodes and edges, a node in the graph network representing a livestock animal and specifying at least a health condition of the represented livestock animal, an edge in the graph network connecting at least two of the nodes and representing an interaction between at least two animals represented by said at least two of the nodes;
based on the health graph network, predicting a potential outbreak among a subgroup of the livestock animals, wherein a connectivity between the at least two of the nodes is determined based on at least a proximity detected of the at least two animals represented by said at least two of the nodes, wherein a proximity detection ignores animals facing away from each other as being in proximity.

2. The method of claim 1, further comprising recommending an amelioration action to prevent the potential outbreak from spreading.

3. The method of claim 1, wherein the health condition is determined at least based on detection a deviation of an animal's behavior from the normal healthy behavior over time.

4. The method of claim 1, further comprising back tracing the edges in the health graph network over time to identify animals that have come into contact with one or more animals involved in the potential outbreak.

5. The method of claim 1, further comprising predicting a movement path of at least one livestock animal in a time scale.

6. The method of claim 5, further comprising visualizing the predicted movement path using augmented reality technology.

7. The method of claim 6, further comprising triggering by sending a trigger event to augmented reality glasses to display the current status of the animals responsive to a deviated value exceeding a predefined threshold value.

8. A computer-implemented system comprising:
a hardware processor;
a memory device coupled to the hardware processor;
the hardware processor operable to at least:
analyze sensor data captured over time associated with a plurality of livestock animals;
determine a health condition associated with the plurality of livestock animals based on the analyzing;
determine interactions of the livestock animals based on the analyzing, the interactions specifying at least a distance between the livestock animals, a duration of the distance, and a frequency of the interactions;
build a health graph network including at least nodes and edges, a node in the network graph representing a livestock animal and specifying at least a health condition of the represented livestock animal, an edge in the network graph connecting at least two of the nodes and representing an interaction between at least two animals represented by said at least two of the nodes;
based on the health graph network, predict a potential outbreak among a subgroup of the livestock animals, wherein a connectivity between the at least two of the nodes is determined based on at least a proximity detected of the at least two animals represented by said at least two of the nodes, wherein a proximity detection ignores animals facing away from each other as being in proximity.

9. The system of claim 8, wherein the hardware processor is further operable to recommend an amelioration action to prevent the potential outbreak from spreading.

10. The system of claim 8, wherein the health condition is determined at least based on detection a deviation of an animal's behavior over time.

11. The system of claim 8, wherein the hardware processor is further operable to back trace the edges in the health graph network over time to identify animals that have come into contact with one or more animals involved in the potential outbreak.

12. The system of claim 8, wherein the hardware processor is further operable to predict a movement path of at least one livestock animal in a time scale.

13. The system of claim 12, wherein the hardware processor is further operable to cause visualizing of the predicted movement path using augmented reality technology.

14. A computer program product comprising a computer readable storage medium having program instructions embodied therewith, the program instructions executable by a device to cause the device to:
- analyze sensor data captured over time associated with a plurality of livestock animals;
- determine a health condition associated with a plurality of livestock animals based on the analyzing;
- determine interactions of the livestock animals based on the analyzing, the interactions specifying at least a distance between the livestock animals, a duration of the distance, and a frequency of the interactions;
- build a health graph network including at least nodes and edges, a node in the nodes representing a livestock animal and specifying at least a health condition of the represented livestock animal, an edge connecting at least two of the nodes and representing an interaction between at least two animals represented by said at least two of the nodes;
- based on the health graph network, predict a potential outbreak among a subgroup of the livestock animals,
- wherein a connectivity between the at least two of the nodes is determined based on at least a proximity detected of the at least two animals represented by said at least two of the nodes, wherein a proximity detection ignores animals facing away from each other as being in proximity.

15. The computer program product of claim 14, wherein the device is further caused to recommend an amelioration action to prevent the potential outbreak from spreading.

16. The computer program product of claim 14, wherein the health condition is determined at least based on detection a deviation of an animal's behavior over time.

17. The computer program product of claim 14, wherein the device is further caused to back trace the edges in the health graph network over time to identify animals that have come into contact with one or more animals involved in the potential outbreak.

18. The computer program product of claim 14, wherein the device is further caused to predict a movement path of at least one livestock animal in a time scale.

19. The computer program product of claim 18, wherein the device is further caused to cause visualizing of the predicted movement path using augmented reality technology.

20. The computer program product of claim 19, wherein the device is further caused to display connectivity among the livestock animals overlaid on a real view of a farm with the livestock animals.

* * * * *